March 8, 1966 W. B. MORTON 3,238,699
FILTER CARTRIDGES AND MACHINE FOR MAKING THE SAME
Filed Feb. 6, 1962 6 Sheets-Sheet 1

INVENTOR
W. BROWN MORTON
BY
ATTORNEYS

March 8, 1966 W. B. MORTON 3,238,699
FILTER CARTRIDGES AND MACHINE FOR MAKING THE SAME
Filed Feb. 6, 1962 6 Sheets-Sheet 2

INVENTOR.
W. BROWN MORTON
BY
Pennie, Edmonds, Morton, Barrows & Taylor
ATTORNEYS March 8, 1966 W. B. MORTON 3,238,699
FILTER CARTRIDGES AND MACHINE FOR MAKING THE SAME
Filed Feb. 6, 1962 6 Sheets-Sheet 3

INVENTOR
W. BROWN MORTON
BY
Pennie, Edmonds, Morton, Barrows & Taylor
ATTORNEY

March 8, 1966 W. B. MORTON 3,238,699
FILTER CARTRIDGES AND MACHINE FOR MAKING THE SAME
Filed Feb. 6, 1962 6 Sheets-Sheet 4

INVENTOR.
W. BROWN MORTON
BY
*Pennie, Edmonds, Morton, Barrows & Taylor*
ATTORNEYS March 8, 1966  W. B. MORTON  3,238,699
FILTER CARTRIDGES AND MACHINE FOR MAKING THE SAME
Filed Feb. 6, 1962  6 Sheets-Sheet 5

INVENTOR.
W. BROWN MORTON
BY
Pennie, Edmonds, Morton, Barrows & Taylor
ATTORNEYS March 8, 1966 W. B. MORTON 3,238,699
FILTER CARTRIDGES AND MACHINE FOR MAKING THE SAME
Filed Feb. 6, 1962 6 Sheets-Sheet 6

INVENTOR.
W. BROWN MORTON
BY
*Pennie, Edmonds, Morton, Barrows & Taylor*
ATTORNEYS

United States Patent Office 3,238,699
Patented Mar. 8, 1966

3,238,699
FILTER CARTRIDGES AND MACHINE FOR
MAKING THE SAME
Woolridge Brown Morton, King George, Va., assignor to
Automotive Development, Inc., Passaic, N.J., a corporation of New Jersey
Filed Feb. 6, 1962, Ser. No. 171,375
7 Claims. (Cl. 53—278)

This invention relates to oil filter cartridges and machine for making the same, and has for its object the production of an oil filter cartridge for automobile engines which is of standard dimensions and filtering performance and of best quality materials but which can be produced at a much smaller cost than the cartridges now on the market.

The manufacture of oil filter cartridges as conducted today involves a large labor cost, presumably because the filters as designed cannot be made by automatic machinery.

In the accompanying drawings I have shown my improved filter cartridge and a preferred embodiment of a machine for making them.

Figure 1:
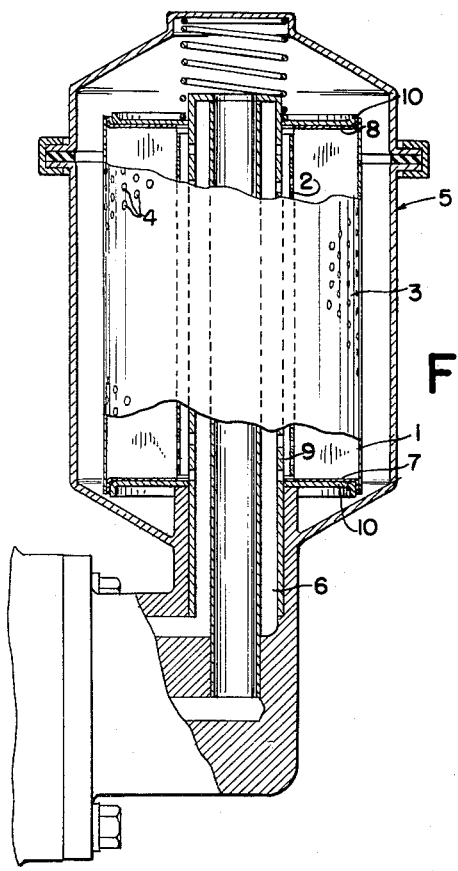
FIG. 1 shows my improved cartridge in vertical section in the conventional cartridge holder of an automobile engine.
Figure 2:
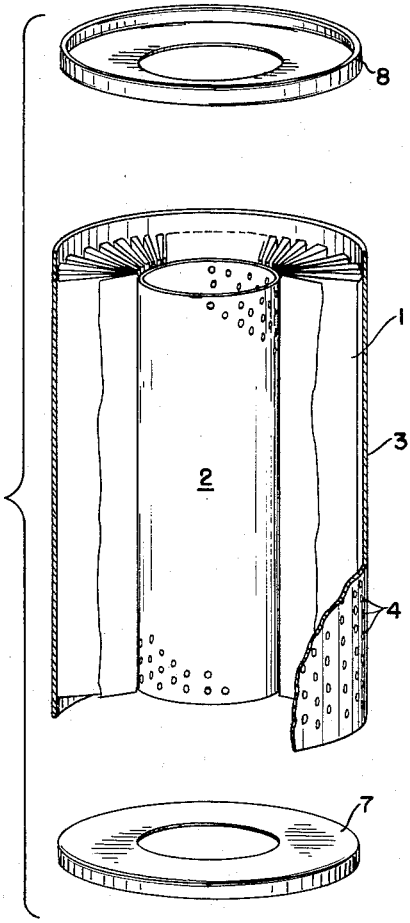
FIG. 2 is a perspective view of the several elements making up the cartridge.

Referring to the drawings, and particularly to FIGS. 1 and 2, 1 indicates the filter element which is made of a strip of filter paper, pleated transversely as shown. In one common size of cartridge the strip is 108 inches long and 4 inches wide, with the pleats one inch wide. The ends of the strip are fastened together to form an endless pleated band which is disposed around a middle core 2 of perforated sheet metal, slightly shorter than the width of the filter strip. The pleated filter and the core 2 are inserted in a short section 3 of paper board tubing which is about one-half inch longer than the width of the filter strip. The body section 3 is perforated throughout its mid-section with holes 4 to permit the free passage of the oil from the enclosing casing 5 into the body section and thence through the filter and perforated core 2 into the discharge passage 6 in the base on which the casing is mounted.

The ends of the body section are closed by molded flanged paper board caps 7 and 8 which are cemented to the pleated filter by means of a layer of viscous cement in which the edges of the paper strip making up the filter are imbedded. The caps 7 and 8 at the bottom and top of the cartridge have central holes fitting over the upstanding stem 9 of the discharge passage 6. The cartridge is supported by a metal plate 10 at the lower end of the stem 9 and a similar plate is pressed against the cap 8 by a spring attached to the cover of the casing 1.

Figure 3:
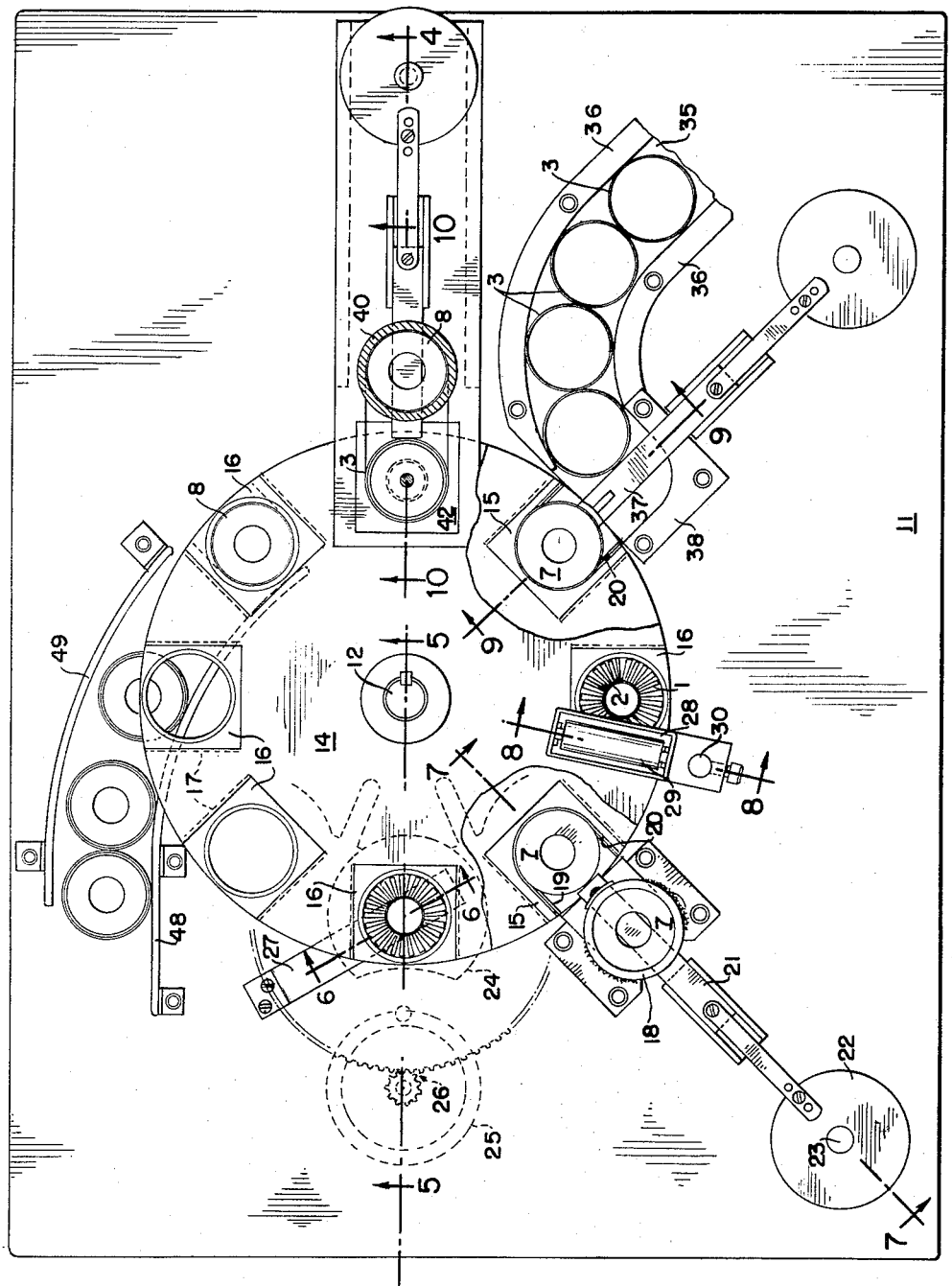
FIG. 3 is a plan view of the machine for making the cartridges, certain parts being broken away and a portion being shown in section on line 3—3 of FIG. 10.

Referring now to FIG. 3, 11 indicates the base of the machine which as shown consists of a rectangular table with a metal plate as the top and corner legs of sufficient length to provide space beneath the top for the driving mechanism for the carrier on which the filter parts are assembled. Mounted near the middle of the base is a vertical shaft 12 to which are attached two circular turrets 13 and 14, respectively, each having eight peripheral pockets, the pockets being square in area to receive detachable plates 15 and 16, respectively, for holding the filter parts which are assembled in the operation of the machine. The plates 15 and 16 are made detachable so that the same machine may be used for making cartridges of varying diameter. The plates 15 and 16 fit snugly in the pockets in the periphery of the carrier wheels 13 and 14 and the edges of the plate may be grooved as shown at 17 to fit over ribs on the sides of the pocket.

Figure 7:
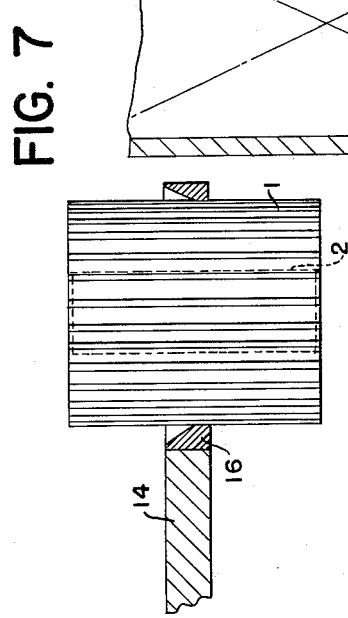
FIGS. 7, 8 and 9 are sectional detail views of an enlarged scale on the correspondingly numbered lines of FIG. 3.

The plates 15 which are fitted in the pockets of the lower carrier disk are shaped to receive and support the bottom cap 7 which is thrust radially into the recess in the plate from a magazine 18 supported on the frame adjacent the periphery of the carrier plate 13, as shown in FIGS. 3 and 7. As shown more particularly in FIG. 3 the plate 15 is formed with a U-shaped opening the curved portion of which is adjacent the inner edge of the plate and with the sides of the U parallel with the radial line extending from the shaft 12 through the middle of the plate. As shown, the plate 15 is of the same thickness as the carrier wheel 13 and the wall of the U-shaped recess is formed with a rib 19 at its bottom edge for supporting the cap 7 when the cap is pushed into the recess in the plate from the magazine 18. The recess of the plate 15 is also provided with a second shoulder 20 near the upper edge of the plate for receiving and supporting the body 5 of the container when the body is pushed into the recess, as will be later described.

The magazine for the cap is of circular cross section and is detachably mounted on the table 11 of the frame so that magazines of different diameter may be used. The caps are stacked in the magazine with their flanges downward and are moved one at a time from the magazine into the recesses in the plate 15 by a pusher 21 which is reciprocated by means of a crank disk 22 attached to the upper end of a vertical shaft supported in a bearing 23 carried by the plate 11.

Figure 5:
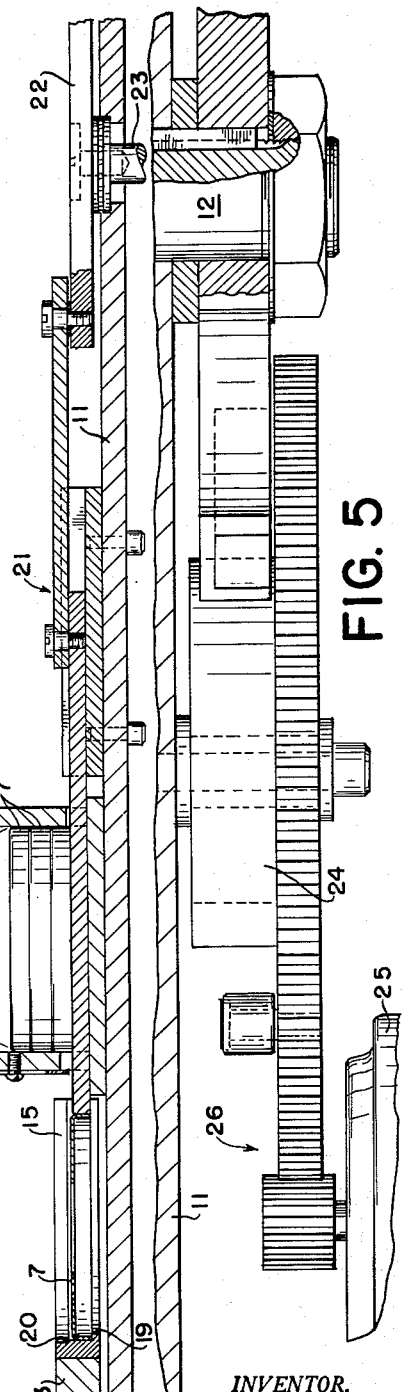
FIG. 5 is a vertical section on an enlarged scale of the lower portion of the machine on the portion of line 4—4 marked 5—5 in FIG. 3.

The shaft 12 to which the carrier plates 13 and 14 are attached is rotated intermittently through one-eighth of a revolution at each operation by any suitable driving mechanism such, for example, as the Geneva gear illustrated in FIGS. 3 and 5. The driving member 24 of the Geneva gear is shown as driven from an electric motor 25 through gearing 26. The motor 25 is preferably a synchronous motor so that the dwell of the machine at each period will be of the same duration.

It will be understood that the cap receiving recesses of the plate 15 are so positioned in the plate that the center of the cap is at the same distance from the center of the shaft 12. Also the magazines 18 which are also made of different sizes for different sizes of caps are mounted on the frame of the machine in such position that the center of the magazine is always at the same distance from the center of the shaft 12. By this arrangement the movement of the slide 21 to properly feed the cap from the magazine into the plates 15 is the same regardless of the size of the cap, and therefore it is only necessary to adjust the length of the connecting rod between the slide and the crank disk 22 when the machine plates and magazine are changed for different sizes of filter cartridges.

In the drawings I have shown this adjustment as accomplished by providing the end of the connecting rod which is attached to the crank disk with three holes for receiving the crank pin to thus enable the machine to make three different size cartridges.

Any suitable mechanism may be used for imparting one rotation to the shaft 23 for each intermittent movement of the carrier wheels. As indicated a separate electric motor is employed for driving the shaft 23 through a reducing gear. By using a synchronous motor no indexing is necessary as the crank disk may be so positioned that the outward movement of the slide 21 takes place during the period that the carrier is in motion.

Figure 4:
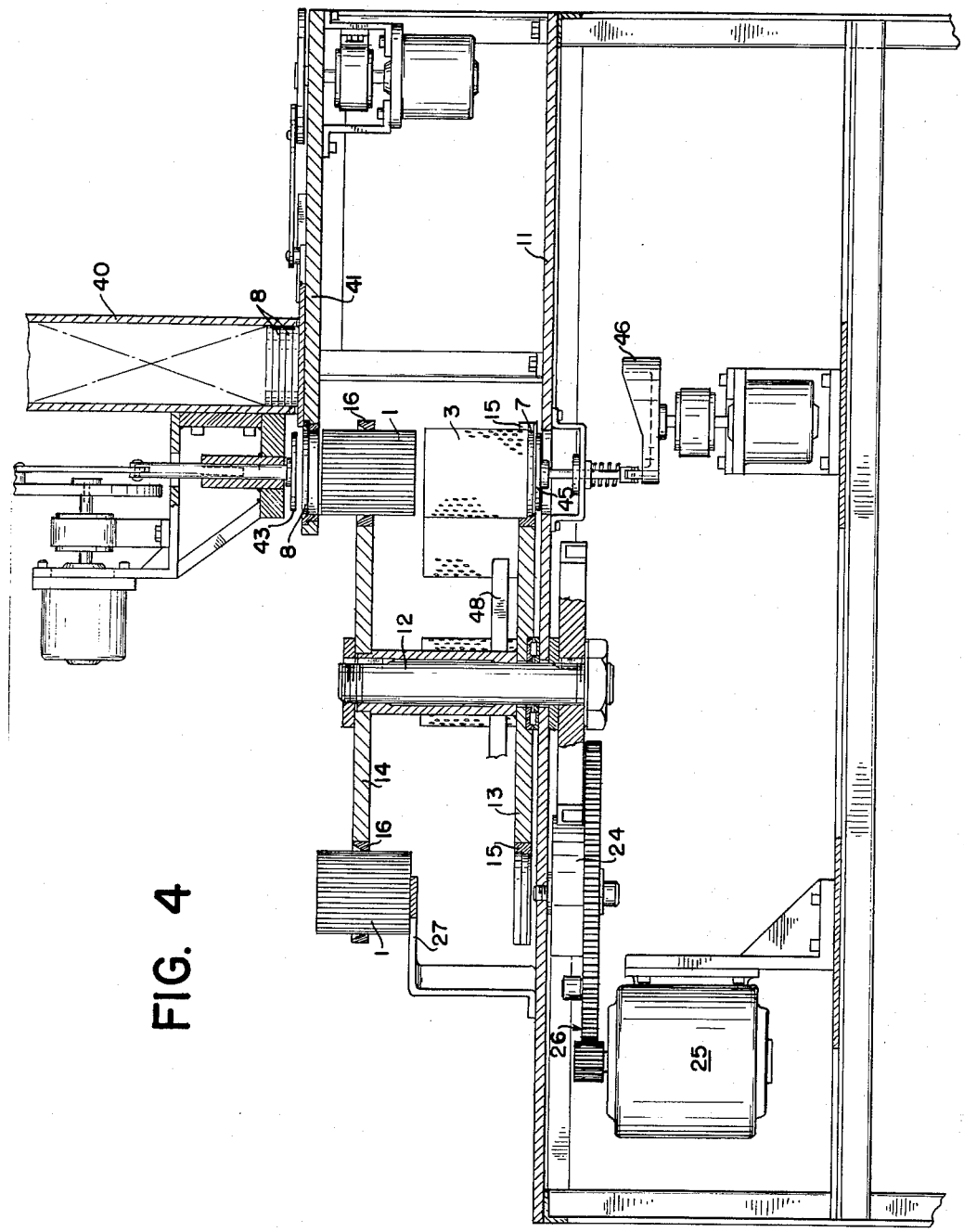
FIG. 4 is a vertical section on line 4—4 of FIG. 3.
Figure 6:
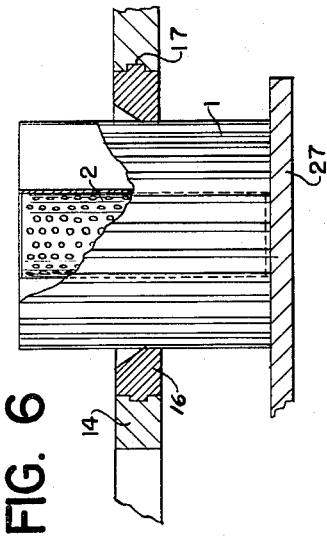
FIG. 6 is a sectional view on an enlarged scale on line 6—6 of FIG. 3.

The plates 16 which are fitted in the peripheral pocket of the upper carrier disk 14 are formed with circular openings of the proper diameter for the passage of the caps 8. See FIG. 10. The opening is of the same diameter as the cap at its lower edge and at its upper side is flared outwardly so that the upper caps when fed from their magazine will be properly positioned as will be later described. In order to facilitate the proper positioning of the assembled filter paper and core in the plate 15 a bar 27 is attached to the plate 11 adjacent this position of the carrier disk with its upper end bent horizontally to extend beneath the opening in the plate 16, as shown in FIG. 4.

Figure 8:
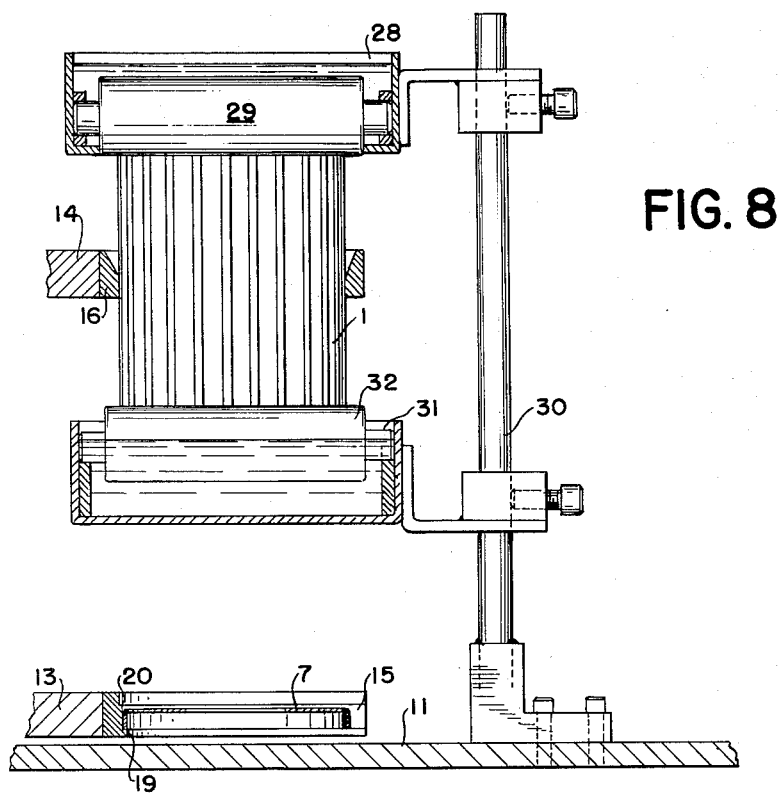

The cap feeding mechanism above described is mounted on the frame of the machine adjacent the second position in the movement of the carrier disk and between the second position and the fourth position gluing mechanism as shown in FIG. 8 is mounted for applying to the top and bottom ends of the pleated filter a thick layer of thermosetting glue. As shown, this gluing mechanism comprises an upper glue pot 28 having mounted therein a glue roller 29 whose lower edge is slightly below the bottom of the pot. The roller substantially fills the slit in the bottom of the pot so that only a layer of glue of the desired thickness will be carried by the roller when its lower surface is engaged by the upper end of the pleated filter paper as the carrier moves the filter from position 2 to position 3. Top gluers of this construction are in common use and the details such as the doctor blades etc., have not been shown. The upper glue pot 28 is mounted for vertical adjustment so that the machine can be adjusted for the manufacture of cartridges of different height as well as different diameter.

Also mounted on the vertical rod 30 which supports the upper glue pot 28 is a lower glue pot 31 in which is mounted a glue roller 32 whose upper surface is somewhat above the upper edge of the glue pot. The glue pot 31 is also preferably adjustably mounted on the rod 30 so that the two glue rollers will apply to the ends of the cylindrical pleated filters the desired quantity of glue.

Figure 9:
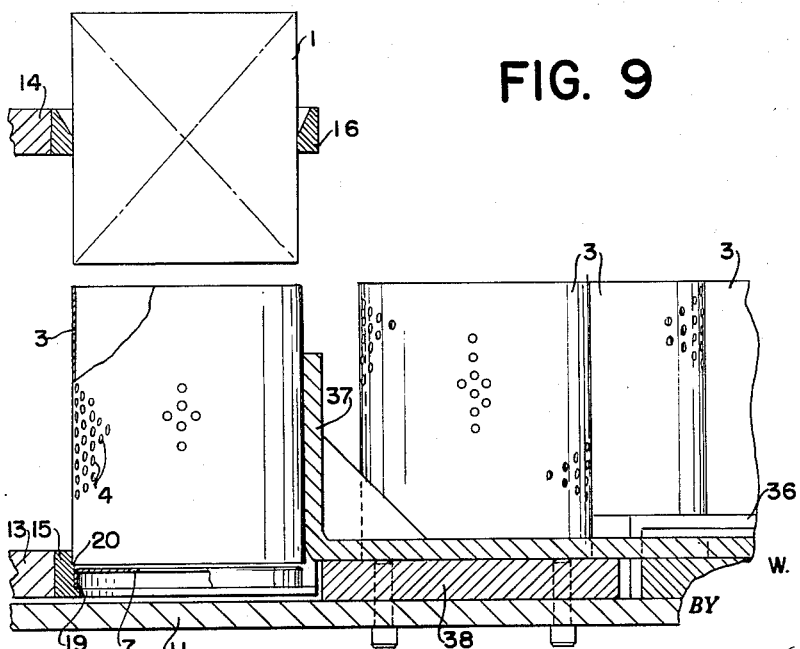

At station 4 the bodies 5 are fed into the U-shaped openings in the plates 15. As shown, the cylindrical bodies are fed to the machine by means of a conveyor 35 on which they are placed by the operator as needed to continuously supply the bodies to the machine. As shown in FIG. 3 the bodies are delivered by the conveyor between the two tracks 36 attached to the table 11 and curved to guide the bodies to a position in front of a feed plunger 37, see FIG. 9. The end portion 38 of the track 36 is detachable so that different end positions can be used to accommodate bodies of different diameter and position them so that their diameter will be aligned with the radial line from the center of the shaft 12 through the middle of the plate 15. The plunger 37 is reciprocated once for each dwell of the carrier disks by a crank mechanism similar to that employed for the cap feed slide 21.

At station 5 the upper caps are fed into position over the assembled filters and cores and at this station the upper caps, the filters and the cores are pushed downwardly from the upper carrier into the body supported at its lower edge in the plates 15. This mechanism is shown in detail in FIGS. 10 and 11. The magazine for the upper caps 40 is similar to the magazine 18 for the lower cap and the mechanism for feeding the caps one at a time from the magazine is also similar to that employed for feeding the lower caps. This magazine is mounted on a horizontal plate 41 supported on the top 11 of the main frame and with its inner end extending over the path of movement of the pockets in the carrier plate. In the portion of the plate which extends over the pockets there is a circular recess in which is mounted a ring 42 which, like the plate 16, has a central opening of a diameter equal to the diameter of the cap. The opening in the ring 42 is flared outwardly on its upper side so that the upper caps 8 when thrust from the magazine by the feed slide will readily drop into the ring 42. It will be understood that the flanges of the caps 8 tend normally to flare out slightly when not restrained and are moved downward in the magazine by a weight on the topmost cap in the magazine sufficiently heavy to move the column of caps downwardly when the slide is withdrawn on its return stroke. The outwardly flaring flanges of the caps support the caps in the upward tapered portion of the ring 42 until the plunger 43 which is mounted for vertical movement over the center of the ring 42 moves downwardly engaging the upper surface of the cap 8 and thence in its continued movement, pushing the cap through the ring 42 and into engagement with the upper glued ends of the cylindrical pleated filters supported in the plates 16. The continued downward movement of the plunger 41 pushes the lower end of the pleated filter paper into the body 8 and thence downwardly until the flange of the upper cap 8 is seated in the upper end of the body.

Any desired mechanism may be employed for operating the upper plunger to make one downward and return movement for each dwell of the carrier wheel. I have illustrated for the purpose a crank disk and connecting arms similar to the mechanism employed for operating the feed slides for these caps and body portions of the filter. The connecting rod of this crank disk is also made adjustable so that the position to which the plunger moves at the end of its down stroke may be modified for making cartridges of different heights.

Figure 10:
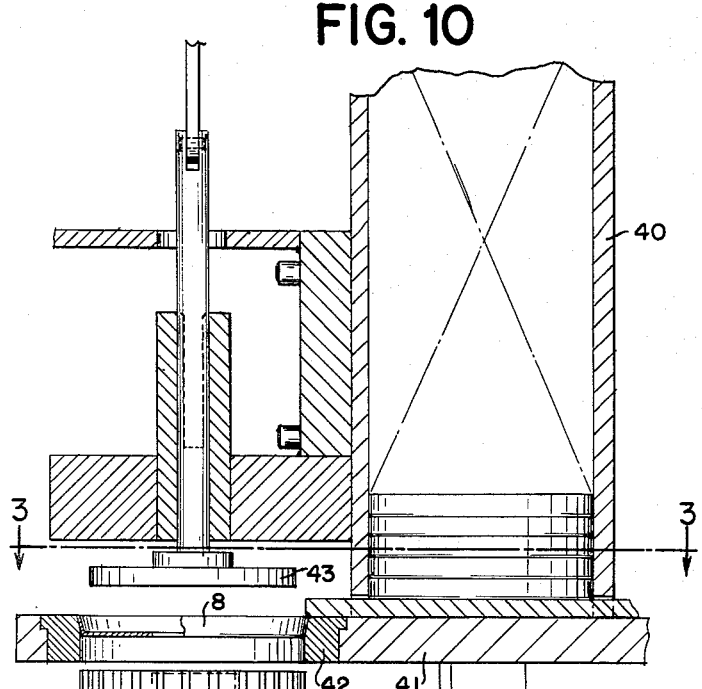
FIG. 10 is a sectional view on the portion of line 4 of FIG. 3 marked 10—10.
Figure 11:
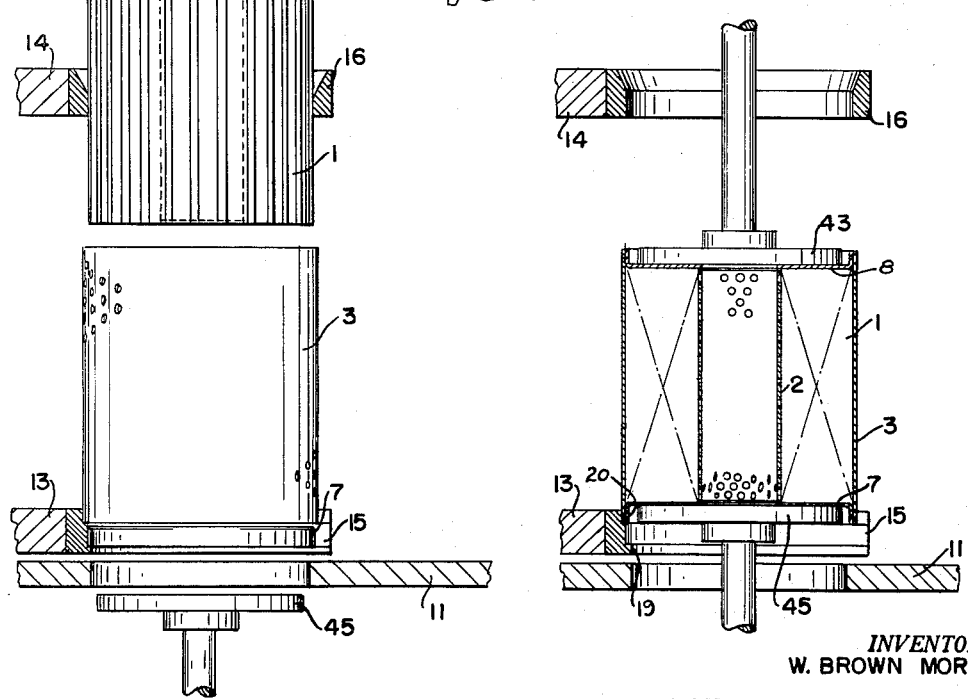
FIG. 11 is a similar view of a portion of the mechanism shown in FIG. 10 with the parts in a different position.

At this station the lower cap is also thrust into the lower end of the body 8. For this purpose the table 11 is provided with a circular opening underlying the path of movement of the pockets and mounted below the plate 11, as shown in FIGS. 10 and 11, is a plunger 45 which is elevated by a cam 46 at the same time that the plunger 43 is forced downwardly by its operating mechanism. The plungers reach the ends of their respective strokes at the same moment and thereby each acts as an abutment for the other to insure adequate pressure of the caps against the glued ends of the cylinder of filter paper.

This operation completes the assembly of the filter cartridges and in the continued movement of the carrier disks the assembled filter cartridges are guided between two tracks 48, 49 which guide the cartridges out of the plates 15 and onto the adjacent surface of the table 11 where they are taken by the operator and placed in cartons or otherwise packed for shipment.

The filters made by the above described machine are equal in every respect to the filters of the same size now on the market and can be made at a much smaller cost. The machine can be operated by two attendants at a rate to produce thirty filters a minute, and the reduced labor cost results in a saving much greater than the added cost to cover the investment in the machine, its maintenance and depreciation.

In the foregoing specification I described a preferred embodiment of my invention. It will be understood however that my invention is not limited to such embodiment but includes all modifications thereof within the scope of the appended claims.

I claim:

1. A machine for making filter cartridges comprising a carrier having a series of holders for filter elements, said holders being shaped to retain said elements in cylindrical form, means for intermittently operating said carrier to bring said holders successively to different stations, means for supporting tubular covers in axial alignment with said elements, means at one of said stations for inserting said elements in said covers, and means for applying end closures to said covers with their inner surfaces in contact with ends of said filter elements, said last named means including means for applying cement to one of the contacting surfaces of said elements and end closures.

2. The machine of claim 1 wherein said cement is applied to the ends of said filter elements while in said carrier.

3. The machine of claim 2 having a carrier for supporting said covers in axial alignment with said elements and means for feeding said covers to said carrier.

4. The machine of claim 1 having means for feeding side end closures to said end closure applying means.

5. A machine for making filter cartridges comprising a carrier having a series of holders for cartridge forming parts, means for feeding end closing members to said carrier, means for positioning tubular outer covers in said holders overlying said members, a second carrier having holders for pleated filter strips, said holders being shaped to retain said filter strips in cylindrical form with the ends of the cylinders below the holders, means for intermittently operating said first mentioned carrier to bring said holders successively to different stations, means for applying cement to one end of the filter strips in said holder, and means for applying said end closing members to the cemented ends of said filters.

6. The machine of claim 5, with means for applying cement to both ends of the filter strips in the holder and means for applying end closing members to both of said cemented ends.

7. A machine for making filter cartridges comprising a carrier having a series of holders for cartridge forming parts, means for intermittently operating said carrier to bring said holders successively to different stations, means at one station for feeding end closing members to said carrier, means for positioning tubular outer covers in said holders overlying said members, means for supplying filter units in cylindrical form to a second station adjacent said carrier, means at one of said stations for feeding end closing members to said holders above said outer covers, means for applying said members to outer covers in a position to contact a filter unit in said covers and means for supplying adhesive to the contacting areas of said unit and said end closing members.

References Cited by the Examiner

UNITED STATES PATENTS

| | | | |
|---|---|---|---|
| 688,284 | 12/1901 | Bilgram et al. | 53—383 X |
| 2,324,572 | 7/1943 | Frederick et al. | 156—69 X |
| 2,586,006 | 2/1952 | Conti | 53—266 |
| 2,642,187 | 6/1953 | Bell | 210—493 |
| 3,054,239 | 9/1962 | Boyer et al. | 53—266 |
| 3,054,507 | 9/1962 | Humbert et al. | 210—493 |

FOREIGN PATENTS 519,427   3/1940   Great Britain.

FRANK E. BAILEY, *Primary Examiner.*

HERBERT L. MARTIN, BERNARD STICKNEY,
*Examiners.*